(No Model.)
W. HANSELL.
ELECTRIC MOTOR AND GENERATOR.
No. 349,392. Patented Sept. 21, 1886.
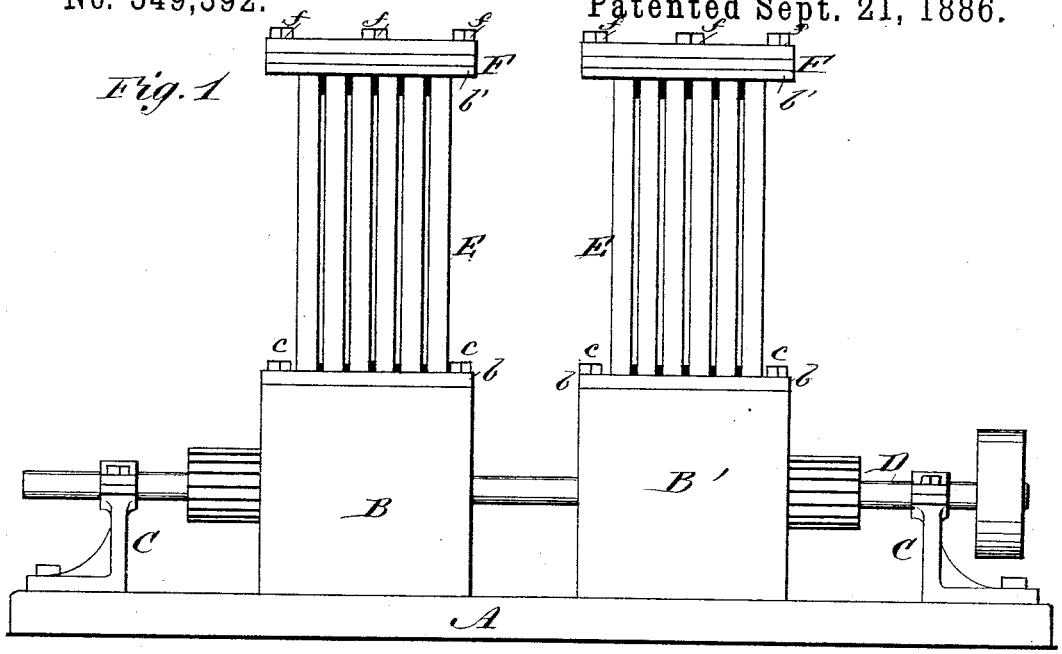
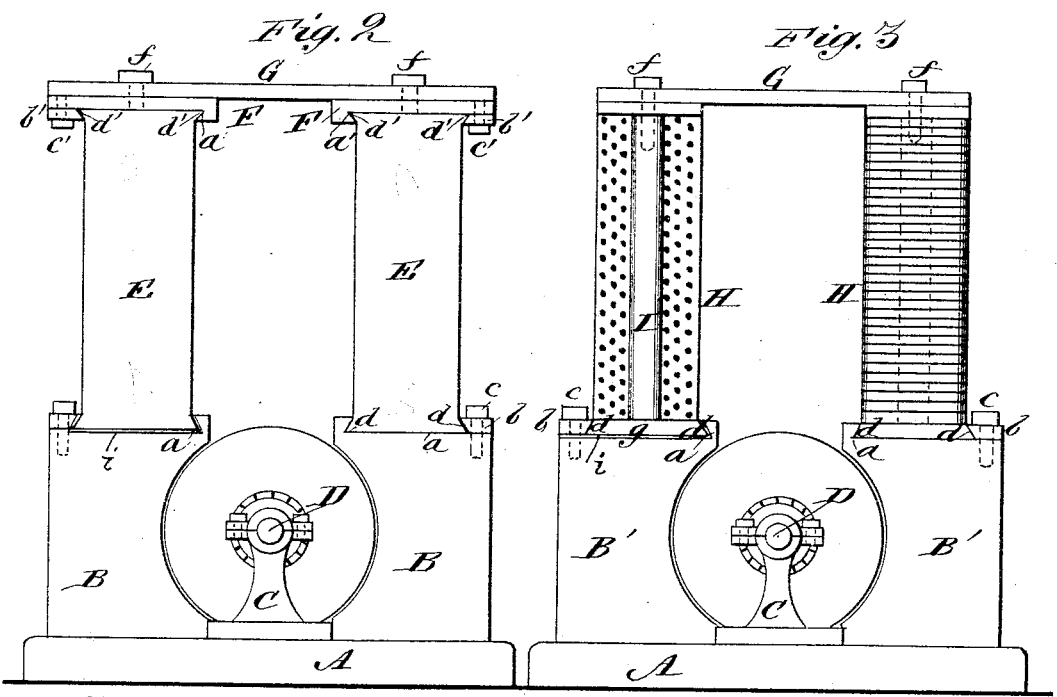
WITNESSES:
C. Neveux
E. Sedgwick
INVENTOR:
W. Hansell
BY Munn & Co.
ATTORNEYS.

UNITED STATES PATENT OFFICE.

WILLIAM HANSELL, OF NEVADA, IOWA.

ELECTRIC MOTOR AND GENERATOR.

SPECIFICATION forming part of Letters Patent No. 349,392, dated September 21, 1886.

Application filed December 22, 1885. Serial No. 186,461. (No model.)

*To all whom it may concern:*

Be it known that I, WILLIAM HANSELL, of Nevada, in the county of Story and State of Iowa, have invented a new and useful Improvement in Electro Motors and Generators, of which the following is a specification, reference being had to the annexed drawings, forming a part thereof, in which—

Figure 1 is a side elevation. Fig. 2 is an end elevation. Fig. 3 is an end elevation partly in section.

Similar letters of reference indicate corresponding parts in the different figures.

The object of my invention is to provide an electric motor or generator with interchangeable field-magnets for the purpose of demonstration in schools, for medical use, and for other purposes requiring or employing electric currents of different kinds and qualities.

My invention consists of an electric motor and electric generator mounted on a base common to both, and having their armatures both secured to and carried by the same shaft.

It also consists in fixed pole-pieces, and removable electro or permanent magnets, arranged so that different electro-magnets or permanent magnets may be interchanged, so as to produce different effects in the armature of the machine.

The bed A supports two pairs of pole-pieces, B B', and pillow-blocks C. In the pillow-blocks C is journaled a shaft, D, which is common to the armatures belonging to the two pairs of pole-pieces B B'. In the upper end of each pole-piece is formed a dovetail slot, $a$, one of the walls of each slot being formed by the removable beveled strip $b$, which is secured to the pole-piece by tap-bolts $c$. The field-magnets, which are adapted to the pole-pieces B and B', are provided with beveled flanges $d$, adapted to the dovetail grooves of the pole-pieces, so that the ends of the field-magnets E may be secured to the pole-pieces B B' by inserting them in the dovetail slots of the pole-pieces and clamping them therein by means of the beveled bar $b$ and the tap-bolts $c$. When the field-magnet is composed of series of permanent bar-magnets E, as shown in Fig. 2, the upper ends of the permanent bar-magnets are provided with beveled flanges $d'$, adapted to the dovetail grooves $a'$ in the connecting-pieces F, and the upper ends of the bar-magnets are secured in the dovetail slots $a'$ by means of the bar $b'$ and the tap-bolts $c'$. The connecting-pieces F of the two parts of the field-magnets are secured to the yoke G by tap-bolts $f$. When electro-magnets are employed as field-magnets, their cores I are provided with flanged ends $g$, which fit in the dovetail grooves $a$ of the pole-pieces, and are clamped therein by the bars $b$ and tap-bolts $c$, and the upper ends of the electro-magnets H are connected by a yoke, G', in the usual way. The construction I have described permits of readily changing the bar or electro magnets, so as to substitute other bar or electro magnets, and in case electro-magnets are employed as field-magnets the winding of the different interchangeable magnets may be adapted to the different modes of connecting the field-magnets in the circuit. For example: One field-magnet may be arranged for a shunt, another may be arranged to be used in series with the armature, another might be provided with one of the forms of compound winding, so that the various methods of connecting up the field-magnet in the circuit might be illustrated by one machine provided with interchangeable field-magnets.

To illustrate the effect of a poor contact between the field-magnets and the pole-pieces, I provide insulating-sheets $i$, which may be inserted between the ends of the field-magnets and the pole-pieces or removed therefrom by loosening the fastenings of the field-magnets.

By mounting two machines on one base, as shown in Fig. 1, one of the machines may be used as a motor and the other as an electric generator, or they may both be used as electric generators or both as motors, thus illustrating the convertibility of the generator into the motor, also illustrating the practicability of the transmission of power by electricity and the generation of electricity by the power so transmitted.

I do not limit or confine myself to any particular form of field-magnet, nor to any form of armature, as my improvement may be applied to all electric generators and motors.

Having thus described my invention, what I claim as new, and desire to secure by Letters Patent, is—

1. The combination of pairs of pole-pieces, an armature-shaft, armatures adapted to the pole-pieces, and means for securing interchangeable field-magnets to the pole-pieces, substantially as and for the purpose set forth.

2. The combination, in an electric motor or generator, of pole-pieces B, having dovetail grooves $a$, beveled bars $b$, tap-bolts $c$, and field-magnets having beveled flanges on their ends, as herein specified.

3. In an electric motor or generator, the combination, with pole-pieces having dovetail grooves formed therein, of bar-magnets E, having beveled flanges on their opposite ends, the connecting-pieces F, having dovetail grooves $a'$, the yoke G, and means for clamping the ends of the permanent bar-magnets E in the connecting-pieces F and in the pole-pieces, as herein specified.

4. The combination, with a base, A, of two pairs of pole-pieces, B B', the armature-shaft D, and armatures adapted to the pole-pieces, and means for securing interchangeable field-magnets to the pole-pieces, substantially as herein specified.

WILLIAM HANSELL.

Witnesses:
F. D. THOMPSON,
ALLAN R. SMITH.